United States Patent [19]
Struziak et al.

[11] Patent Number: 5,658,079
[45] Date of Patent: Aug. 19, 1997

[54] HYDRODYNAMIC FLUID FILM JOURNAL BEARING

[75] Inventors: Ronald M. Struziak, Longmeadow, Mass.; John M. Beck, East Granby, Conn.

[73] Assignee: United Technologies Corporation, Hartford, Conn.

[21] Appl. No.: 461,830

[22] Filed: Jun. 5, 1995

[51] Int. Cl.$^6$ .................................................. F16C 27/02
[52] U.S. Cl. ........................................................ 384/106
[58] Field of Search ................................. 384/106, 103, 384/104, 105, 119

[56] References Cited

U.S. PATENT DOCUMENTS

| | | | |
|---|---|---|---|
| 3,809,443 | 5/1974 | Cherubim | 384/106 |
| 4,552,466 | 11/1985 | Warren | 384/106 |
| 4,767,222 | 8/1988 | Paletta et al. | 384/106 |

*Primary Examiner*—Lenard A. Footland
*Attorney, Agent, or Firm*—Norman Friedland

[57] ABSTRACT

The top foil (12) of the hydrodynamic fluid film journal bearing (10) carries opposing tabs (23,25) at the side edges adjacent the free end (17) thereof and extends radially outward to fit adjacent to the side edges (19,21) of the intermediate foil 14 and the ends of the key 18 when rolled into a cylinder and inserted into the bore of sleeve (24) to prevent skewing of the top foil. In another embodiment skewing is prevented by incorporating opposing tabs (37, 39,50,52) at the free ends (31,54) of the top foil (12a) and intermediate foil (14a) that project through predetermined sized slots (40,42) formed in the side edges (44,46) at the fixed end of intermediate slot (14a). The tabs overlie the side edges of the intermediate foil (14b) and bump foil (15) when rolled into a cylinder and prevent skewing and enhancing journal bearing performance.

4 Claims, 4 Drawing Sheets

5,658,079

HYDRODYNAMIC FLUID FILM JOURNAL BEARING

TECHNICAL FIELD

This invention relates to journal bearings and particularly to anti-skewing means for a hydrodynamic fluid film air bearing.

BACKGROUND ART

As is well known in the bearing technology, the hydrodynamic air bearing consists of a top foil, an intermediate foil and bump foil that are reversed rolled into a cylindrical shape that, in turn, is mounted within a sleeve for radially supporting a rotating shaft. An example of apparatus utilizing this type of bearing is the air cycle machines utilized for cooling aircraft manufactured by the Hamilton Standard division of United Technologies Corporation, the assignee of this patent application. In these designs, one end of each foil is secured while the opposite end is free. Upon reaching a predetermined speed, the air in the sleeve is forced between foils that form wedges or air pockets which serve as a cushion for supporting the shaft without the need of liquid lubrication. It has been found that on occasion, the free end of the foils would move axially and become skewed either during operation of the rotating machinery or when the journal air bearing is being installed. The effect of the skewing is that the bearing tightens which increases shaft torque and under certain circumstances could prevent proper air film formation resulting in malfunction of the bearing. This invention serves to obviate this problem by providing means for preventing the foils from skewing. In one embodiment this invention contemplates incorporating end tabs at the end of the free end of the top foil that fit into the keyway and in another embodiment tabs at the side edges assure that the top foil in the first embodiment and all the foils in the second embodiment remain in the cylindrical shape.

SUMMARY OF THE INVENTION

An object of this invention is to provide and improved hydrodynamic fluid film journal bearing.

A feature of this invention is to provide side tabs to the free end of the top foil of the journal bearing to hold it in a cylindrical shape. In another embodiment the tabs are mounted at opposite sides of the end of the free end of the top foil that extend so as to overlap the side edges of the intermediate foil and bump foil to also hold all the foils in the cylindrical shape.

The foregoing and other features of the present invention will become more apparent from the following description and accompanying drawings.

DETAILED DESCRIPTION OF THE PREFERRED EMBODIMENT

Figure 1:
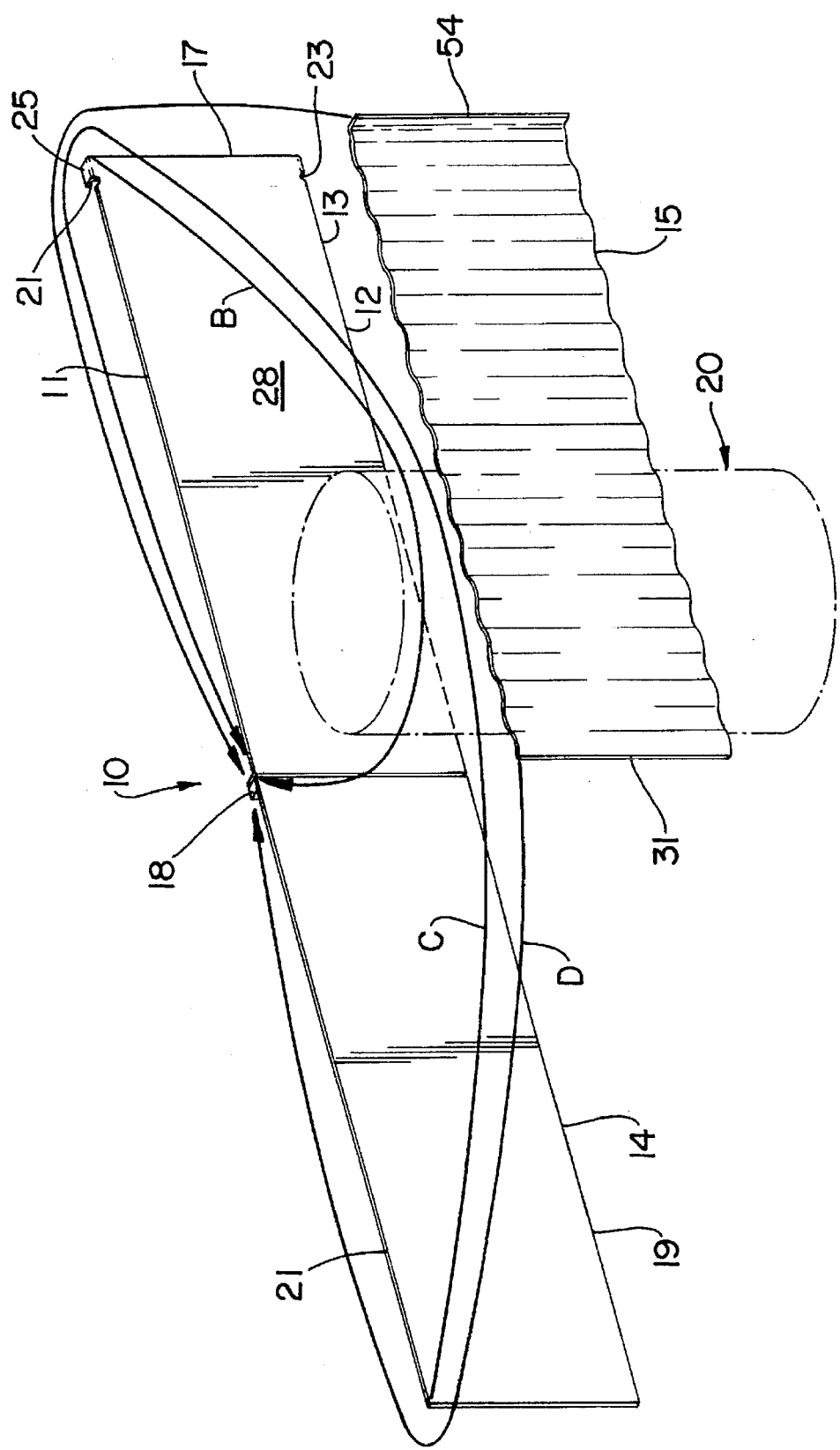
FIG. 1 is an exploded view in perspective illustrating one embodiment of the invention incorporated in the hydrodynamic fluid film journal bearing which is shown in the uncoiled position and includes a phantom view in schematic showing the bearing in the coiled position.

One embodiment of this invention one of the preferred embodiments can best be understood by referring to FIGS. 1-3 which show the hydrodynamic fluid film journal bearing generally illustrated by reference numeral 10 comprising top foil 12, intermediate foil 14 and bump foil 15. The top foil 12 and intermediate foil 14 which are made from sheet metal stock with a given spring rate are attached end to end by any suitable bonding means such as welding, brazing or the like at the weldment juncture 16 which is in alignment with the key 18. Key 18 which lies transverse to the longitudinal axis of the foils extends in a radial direction when the foils are wrapped into a cylinder about the axis of rotation A as shown as reference numeral 20 in the phantom view. As will be described in further detail hereinbelow, the key 18 fits into a transverse slot or keyway 22 formed in the wall 23 on the inner diameter of sleeve 24. The bump foil 15 which is formed from a corrugated thin sheet metal material having a given spring rate is wrapped around the top foil 12 and the intermediate foil 14 when in the coiled position to form a cylinder adapted to fit into the bore of sleeve 24 adjacent to wall 23. As will be appreciated from the foregoing, the top foil, intermediate foil 14 and bump foil 15 are configured in the same rectangular shape and are wrapped around in a reverse roll to form a cylinder such that when inserted into sleeve 24 the outer foil 12 surrounds the shaft (not shown), the bump foil 15 is adjacent to wall 23, and the key 18 extends into the keyway 22 of the sleeve 24. The inner face 28 of top foil 12 which lies adjacent to the rotating shaft (not shown) is preferably coated with a dry lubricant so that when the shaft is accelerating to its operating speed during start up or decelerating as the shaft is coasting to stop, and when the pressure of the air in the wedge of the foils is not sufficient to support rotation, the dry lubricant will serve as an anti-friction means for maintaining wear and operability of the bearing. When in the operating condition and the shaft has reached a predetermined speed the pressure of the air that is forced into the wedges formed between the over lying surfaces of the top foil 12, intermediate foil 14 and bump foil 15 serves to support the shaft and the spring rates of the foils is selected to obtain the proper compliance of the bearing.

In accordance with this invention, the width of the free end 17 is made wider than the other portion of top foil 12 to extend beyond the side edges 11 and 13. This extended portion is bent radially outwardly adjacent to the stress relief slots 21 and 23 to define tabs 25 and 27. As seen in FIG. 3 which is taken along lines 3—3 of FIG. 2 when the top foil and intermediate foil are wrapped as depicted by the arrows B and C, (FIG. 1) respectively to form a cylinder the tabs 25 and 27 extend into keyway 22 and overlie a portion of the opposing side edges 15 and 17 of the intermediate foil 14 and opposing ends of key 18. This obviously prevents the top foil 12, intermediate foil 14 and bump foil 15 from moving axially and deforming the cylindrical shape and becoming skewed.

While this embodiment does not show all the details of the final configuration of the hydrodynamic fluid film journal bearing, it is disclosed herein to detail the inventive portion of this type of journal bearing and the details of the final design configuration, as one skilled in this art will appreciate, will depend upon the particular application for the intended use. Obviously, other methods of forming the tabs at the end of the top foil may be employed without departing from the scope of this invention.

Figure 2:
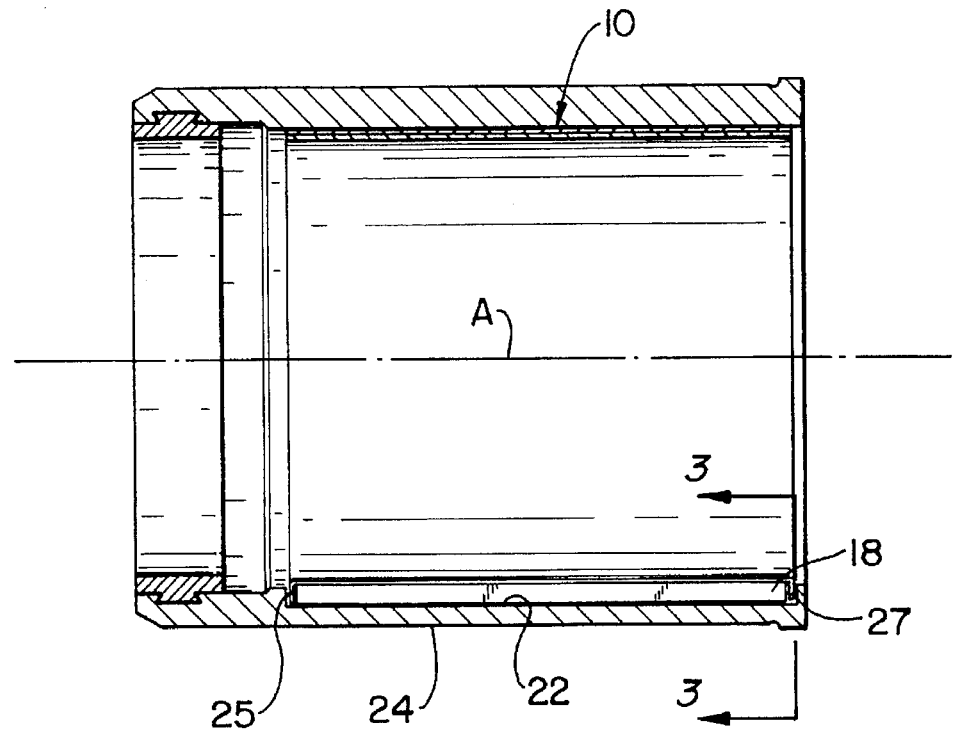
FIG. 2 is a sectional view taken along the longitudinal axis of the hydrodynamic fluid film journal bearing of the embodiment of FIG. 1.
Figure 3:
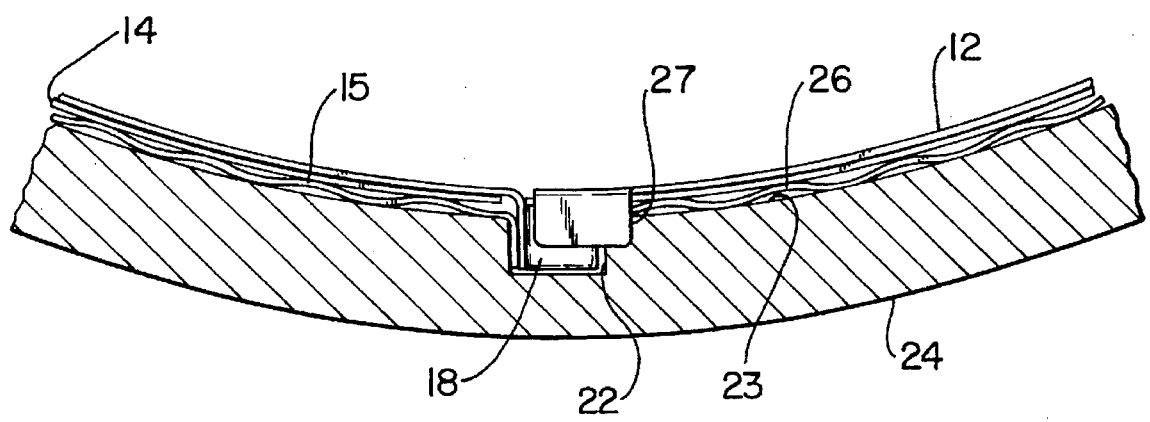
FIG. 3 is a partial sectional view taken along lines 3—3 of FIG. 2.

Referring next to FIGS. 4-7 which depict another embodiment of this invention disclosing the hydrodynamic fluid film journal bearing that has been fully designed for a particular application and includes elements common to the hydrodynamic fluid film journal bearing depicted in FIGS. 1-3, namely, the top foil 12a, the intermediate foil 14a and bump foil 15, modified to include another anti-skewing means. In this description, all like elements in all the Figs. are depicted with the same reference numerals.

Figure 4:
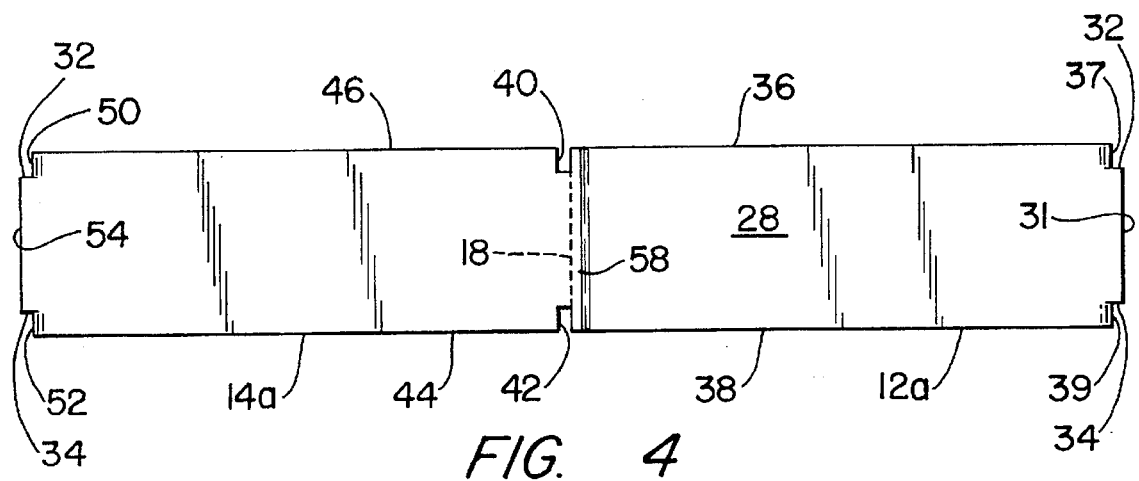
FIG. 4 exemplifying another embodiment of this invention and is a plan view of the uncoiled hydrodynamic fluid film journal bearing.

In accordance with this invention and referring particularly to FIG. 4, the free end 31 of the top foil 12a is slit at 32 and 34 a short distance inwardly from the side edges 36 and 38 and are bent radially outward (into the paper as shown in this FIG. 4) to form tabs 37 and 39 that ultimately fit into keyway 22. It should be understood that for purposes of this description this embodiment is intended for use with the sleeve 24 depicted in FIG. 2. Because the intermediate foil 14 wraps around the top foil 12a, slots 40 and 42 adjacent to key 16 are cut a short distance inwardly into the side edges 44 and 46 of intermediate foil 14a to allow the tabs 37 and 39 to project into keyway 22. Tabs 50 and 52 formed at opposite ends of the free end 54 of intermediate foil 14a are slit and bent similar to tabs 37 and 39 to project outwardly as shown in FIG. 4. When reversed rolled, tabs 50 and 52 extend radially outwardly to bear against one end 31 of bump foil 15 and tabs 37 and 39 bear against the opposite end of bump foil 15.

Figure 6:
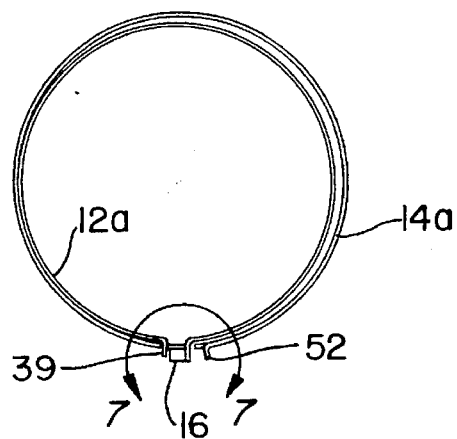
FIG. 6 is an end view of the bearing in FIG. 5 when in the coiled position.
Figure 7:
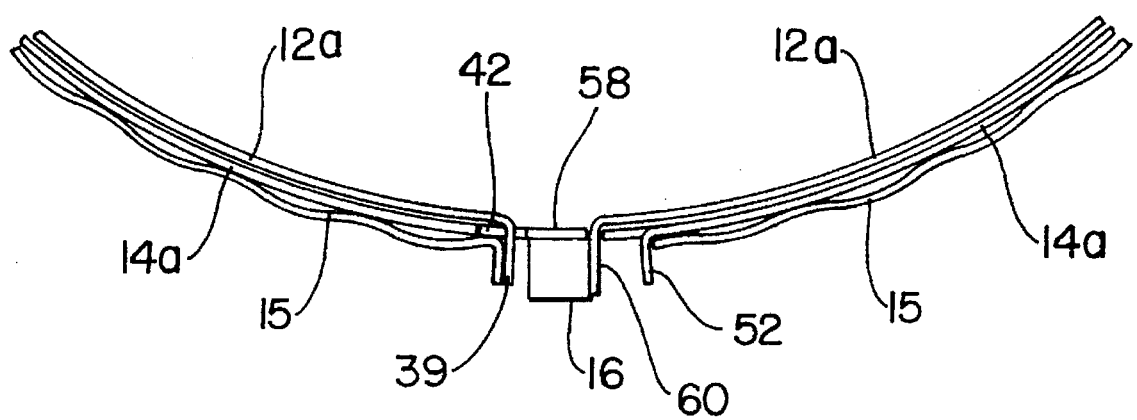
FIG. 7 is an enlarged partial view taken along lines 7—7 of FIG. 6 illustrating the details of the invention.

As best seen in FIGS. 6 and 7 the foils are reversed rolled to form a cylinder that fits into sleeve 24 and the key 18 similar to that shown in FIG. 3 fits into keyway 22. Obviously, since tabs 37 and 39 fit into the diametrically opposite slots 40 and 42 and the width of the tabs and depth of the slots are equally dimensioned, top foil 12a is constrained axially. This prevents the top foil from skewing such that the cylinder cannot be deformed. Like the embodiment disclosed in FIGS. 1-3, this embodiment prevents skewing so that there is no deficit in the performance of these journal bearings and as a matter of fact the performance are at the optimum. This prevents the foils from sliding axially to distort the cylinder and skew the free ends which would increase bearing shaft torque, tighten the bearings and prevent an optimum air film form being developed, all of which would at the very least hinder performance, or cause a malfunction of the bearing.

Figure 5:
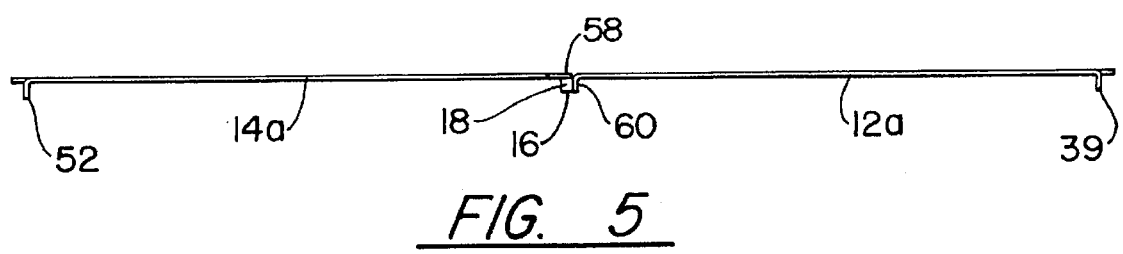
FIG. 5 is a front view of the bearing depicted in FIG. 4.

For illustration of affixing the key to the top foil in both embodiments and for the sake of simplicity and convenience FIG. 5 is used for explanation purposes. As noted, the fixed end 58 of top foil 12 overlies the key 16 and is bonded thereto in a known suitable manner as described above and the fixed end 60 is bent inwardly to form a shoulder to complement and bear against the side edge of key 16 so as to be likewise bonded thereto by suitable means.

Although this invention has been shown and described with respect to detailed embodiments thereof, it will be appreciated and understood by those skilled in the art that various changes in form and detail thereof may be made without departing from the spirit and scope of the claimed invention.

We claim:

1. For a hydrodynamic fluid film journal bearing having a top foil, an intermediate foil and bump foil, the improvement comprising tab means on the top foil for preventing the top foil from moving axially to deform the cylindrical shape when the top foil, intermediate foil and bump foil are wrapped into a cylinder, said top foil includes an elongated flat rectangularly shaped member having opposing ends and opposing sides, a key attached to one of said opposing ends of said rectangularly shaped member, said tab means includes opposing projecting portions at the other end of said opposing ends each extending beyond said opposing sides, said opposing projecting portions being bent to overlie a portion of said opposing side edges of said top foil when rolled into a cylinder to prevent said top foil from skewing.

2. For a hydrodynamic fluid film journal bearing as claimed in claim 1 including stress relief slots formed in said opposing side edges adjacent to each of said projecting portions.

3. For a hydrodynamic fluid film journal bearing as claimed in claim 1 wherein said intermediate foil includes a similar shaped rectangular member having other opposing side edges and other opposing ends, one of said other opposing ends being attached to said key to form an larger elongated rectangular member to be rolled and overlie the top foil to define a cylinder, said similar shaped elongated member including opposing side edges, said tab means overlying a portion of each of said opposing side edges of said intermediate foil to prevent said top foil, said intermediate foil from skewing.

4. For a hydrodynamic fluid film journal bearing as claimed in claim 3 wherein said bump foil includes another elongated corrugated member defining a rectangular shaped member when rolled overlies said cylinder, said elongated corrugated member including opposing side edges, said tab means overlying a portion of each of said opposing side edges of said intermediate foil and opposing side edges of said bump foil to prevent said top foil, said intermediate foil and said bump foil from skewing.

* * * * *